Dec. 29, 1925.  
R. J. FOSTER  
COTTON CULTIVATOR  
Filed August 6, 1923  
1,567,255  
4 Sheets-Sheet 4
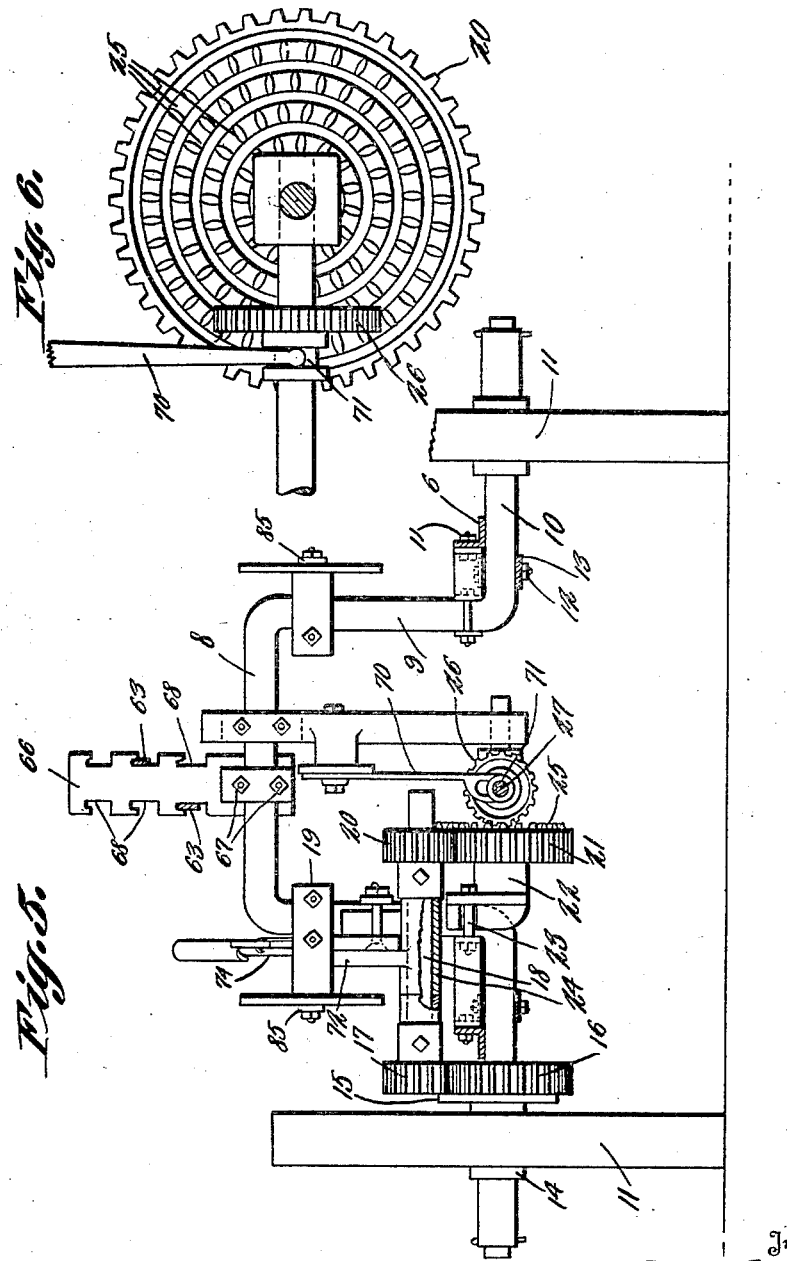
Inventor  
R. J. Foster  
By C. A. Snow & Co.  
Attorneys Patented Dec. 29, 1925.

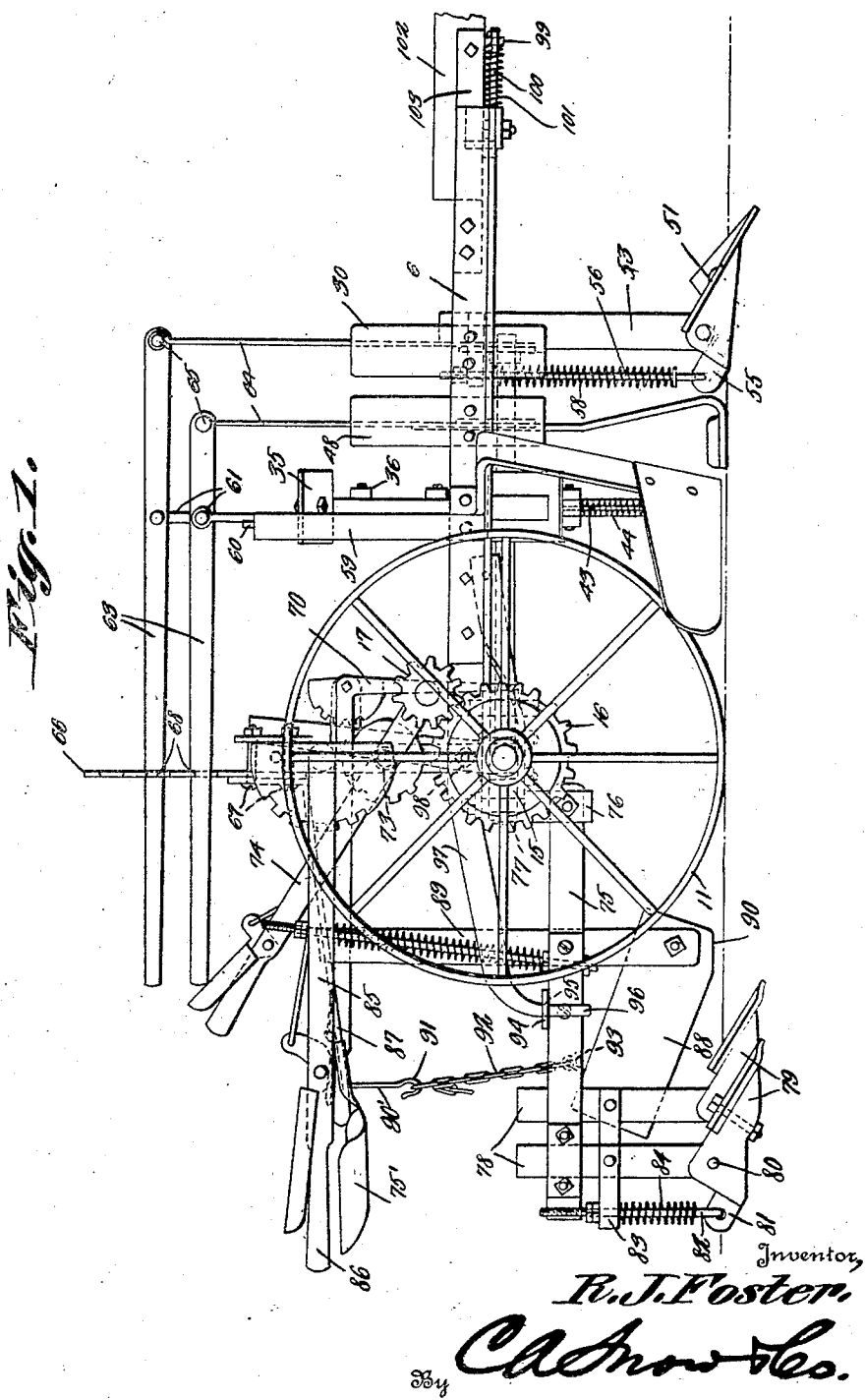

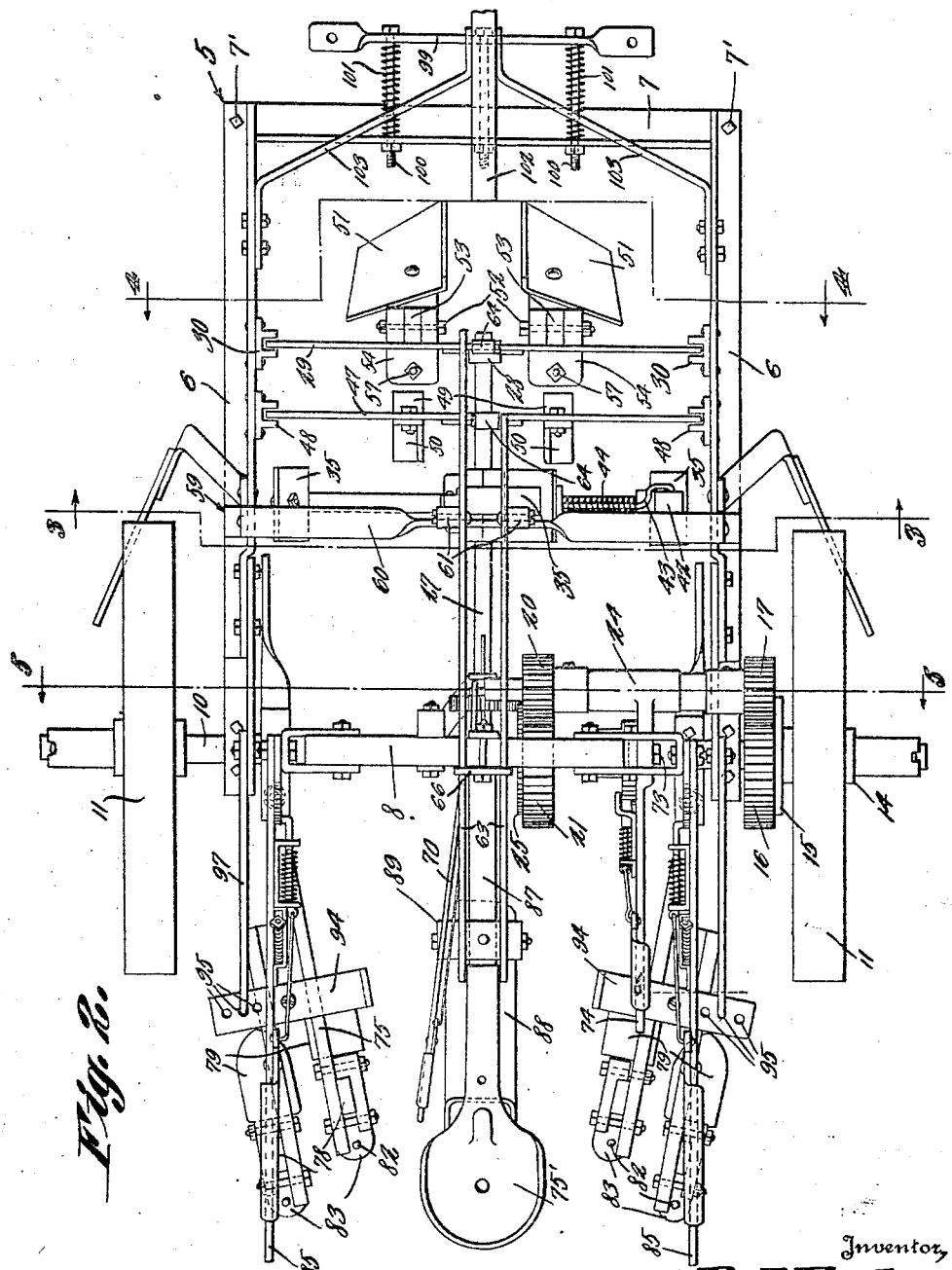

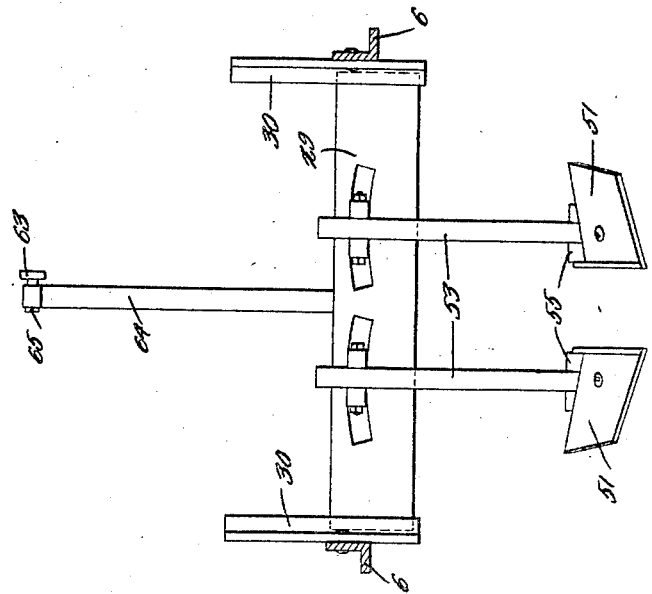

1,567,255

UNITED STATES PATENT OFFICE.

ROBERT J. FOSTER, OF WESTPLAINS, MISSOURI.

COTTON CULTIVATOR.

Application filed August 6, 1923. Serial No. 656,004.

*To all whom it may concern:*

Be it known that I, ROBERT J. FOSTER, a citizen of the United States, residing at Westplains, in the county of Howell and State of Missouri, have invented a new and useful Cotton Cultivator, of which the following is a specification.

This invention relates to agricultural machines, and more particularly the rotary chopper heads especially designed for use in preparing and cultivating land in which cotton is grown.

A further object of the invention is to provide a chopping head of this character wherein various elements thereof will automatically adjust themselves to soil conditions.

A further object of the invention is to provide a device of this character wherein the cultivating blades may be adjusted to the rows of plants being cultivated to vary the amount of soil thrown onto the plants.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention:

Referring to the drawings:

Figure 1 is a side elevational view of a cultivating machine equipped with a chopping head constructed in accordance with the invention.

Figure 2 is a plan view thereof.

Figure 3 is a sectional view taken on line 3—3 of Figure 2.

Figure 4 is a sectional view taken on line 4—4 of Figure 2.

Figure 5 is a sectional view taken on line 5—5 of Figure 2.

Figure 6 is an enlarged elevational view of the change speed gearing.

Referring to the drawings in detail, the frame of the machine of which the chopping head forms a part is indicated generally by the reference character 5 and embodies side bars 6 and a forward end bar 7, the forward end bar 7 having its ends connected to the side bars 6 by means of the securing bolts 7'.

The supporting axle which is indicated at 8 is inverted U-shaped in formation as clearly shown by Figure 5 of the drawings, the side bars 9 thereof having their ends formed into laterally extending right angled portions 10 on which the supporting wheels 11 are positioned.

As shown, the rear ends of the side bars 6 of the frame are mounted on the axle, and have direct engagement with the right angled portions 10 thereof, the connection being made through the securing bolts 11 and 12 and securing plates 13. Secured to the hub 14 of one of the wheels 11 is a flange 15 to which is secured a gear 16 that meshes with a pinion 17 mounted on the swinging shaft 18, the swinging shaft being connected to one of the side bars 9 as by means of the connecting plate 19. At the opposite end of shaft 18 is a pinion 20 designed to move with the shaft, which pinion 20 meshes with gear wheel 21 mounted on the stub axle 22 which is also bolted to one of the bars 9 at 23. It is to be understood that the shaft 18 rotates in the bearing 24 forming a part of the shaft support.

Forming a part of the gear 21 are ring gears 25 that mesh with the driven pinion 26 secured to one end of the shaft 27 that operates in the bearing 28 formed in the vertically movable bar 29 that has its ends supported in the guides 30 positioned between the side bars 6 of the frame.

Mounted on the shaft 27 and adapted to move therewith is the rotary chopper 31 which includes a hub 32 and radiating arms 33 which arms support the adjustable arms 34 that in turn provide supports for the pivoted blades 35. Secured to the outer end of each arm 33 is a strap 36 through which extends a bolt 37 that moves in the elongated opening 38 of the arms 34 associated therewith, whereby the arms 34 may be adjusted with respect to the arms 33 to cause the blades 35 to dig at various depths.

A strap 39 has connection with each arm 34 and has a bolt 40 formed in the elongated opening 41 of the arm 33 associated therewith to further restrict lateral movement of the arms 34 but permit of a free adjustment longitudinally thereof.

Forming a part of each blade 35 is a rearwardly extending ear 42 formed with an opening to receive one end of the tension rod 43 associated therewith, the opposite end of the rod passing through a suitable opening formed on the strap 39, which rods support the coiled springs 44 that engage the straps 39. Thus it will be seen that due to this construction, the blades 35 may swing rearwardly against the tensions of the springs 44, should the blades contact with a stone or other obstruction which would ordinarily cause them to break. When the blades move as described, it is obvious that the coiled springs will return the blades to their initial positions. Nuts 45 are positioned on the threaded extremities 46 of the bolts 40 and are designed to adjust the rods to cause the blades to move under various degrees of pressure.

Associated with the bar 29 is a supporting bar 47 that has its ends moving in the guides 48 bolted to the inner surfaces of the side bars 6 of the frame, so that a vertical movement of the bar 47 will be permitted.

Secured to the bar 47 are arms 49 that have their lower ends extended rearwardly at 50 where they act as covering blades to cover or flatten the ground surface at a point directly behind the plows 51 which are pivotally mounted at 52, to the lower ends of the beams 53 that are shown as adjustably supported in the supports 54.

These plows 51 have rearwardly extended arms 55 that are formed with openings to receive the lower ends of the rods 56 that have their upper ends extended through the supports 54 at 57, coiled springs 58 being provided on the rods 56, and positioned between the arms 55 and supports 54 to restrict pivotal movement of the plows 51.

Mounted on the frame 6 is an inverted U-shaped frame 59 which is disposed intermediate the ends of the frame, the upper bar 60 thereof lying in a plane an appreciable distance above the bars 29 and 47. Supports 61 are secured to the bars 60 at a point intermediate its ends, the supports being provided with bolts 62 providing bearings for the operating arms 63 that have their forward ends pivotally connected with the connecting links 64 at 65, the lower ends of the connecting links 64 having connection with the bars 29 and 47 so that movement of the arms 63 will result in a relative movement of the bars 29 and 47 to adjust the devices carried thereby with respect to the ground surface over which the machine is operating. In order that the operating arms may be held in their positions of adjustment, a keeper bar 66 is provided, which bar is secured to the axle at 67, and is formed with notches 68 to receive the arms, as clearly shown by Figure 5.

The pinion 26 is splined on one end of the shaft 27 and is controlled by means of the controlling lever 70 which has connection with the sleeve 71 of the pinion 26 so that the pinion 26 may be moved into engagement with a predetermined ring gear 25 to vary the speed of rotation of the shaft 27 and consequently change the speed of rotation of the rotary chopper 31 to better adapt the machine for a particular use.

As before stated the shaft 18 receives rotary motion through the gear 16 and pinion 17 and in order to permit the shaft to be moved into and out of operation, the bearing 24 in which the shaft moves is supported on the arm 72 which arm has pivotal connection with the axle or one of the side bars thereof, through the bolt 73.

The free end of the arm 72 is formed into a hand lever 74 disposed adjacent to the operator's seat, whereby the operator may by grasping the lever 74 move the pinions 17 and 20 into and out of operation. Supported at the rear of the machine are cultivator bars 75 that have their forward ends pivotally connected to the bearing members 76 that in turn have pivotal connection with the brackets 77 whereby the bars 75 may be adjusted in both vertical and horizontal planes, to meet the requirements of the operator.

These bars 75 support the cultivator beams 78 that have cultivator blades 79 pivotally supported at the lower ends thereof at 80, the rear ends of the cultivators blades being provided with rearwardly extended ears 81 that are apertured to receive the lower ends of the rods 82, the upper ends of the rods extending through keepers 83. On each of the rods 82 and disposed between the ear 81 thereof and keeper 83 is a coiled spring 84 that restricts movement of the blades 79, allowing the blades to move rearwardly when they meet with obstructions lying in the paths of travel of the blades.

Operating levers 85 have pivotal connection with the side bars 9 of the axle, and have their handle portions 86 disposed in proximity to the operator's seat where they may be easily manipulated by the operator to regulate the operation of the cultivator blades.

The operator's seat which is indicated at 75' is supported on the bar 87 that has connection with the central portion of the axle, and this bar provides a support for the guard 88 that has connection with the bar 87 through the parallel arms 89 that are shown as extending in proximity to the ground surface.

The forward edges of the guard 88 are cut away at 90 so that the guards will ride over certain obstructions which may lie in the path of travel thereof.

Extending downwardly from the bar 87, is a link 90' formed with a hook member 91 adapted to hook into one of the links of the chain 92 which has connection with the guard 88 through the eye bolt 93. Thus it will be seen that due to this construction, the guard 88 may be pivotally adjusted to cause the rear end thereof to operate at various distances from the ground surface to allow predetermined quantities of dirt to be thrown around the plants under cultivation.

Mounted on the cultivator bars are plates 94 which are formed with a plurality of openings 95 to receive the reduced ends 96 of the arms 97, which arms are pivotally supported at 98 whereby they may be readily and easily moved into and out of operation.

These bars 97 act as braces to hold the cultivator bars 75 against lateral movement after they have been adjusted. At the forward end of the frame is a bar 99 which has connection with the frame through the medium of the bolts 100 on which bolts are positioned the coiled springs 101 to restrict movement of the bar 99 when the machine is hitched to a tractor or similar power device. When the machine is to be operated by animal power, a tongue 102 is provided, which has connection with the side bars 6 of the frame through the bars 103.

In the use of the device, assuming that the machine is to be used for conditioning the ground surface, for the replanting of cotton, the machine is positioned on the field and the operating levers 63 are moved to properly adjust the shaft 27 to cause the choppers 35 to operate at the desired depth.

The driving pinion is now moved into engagement with the proper ring gear 25 to rotate the shaft 27 at the desired speed whereupon the blades 35 will revolve to chop the stubbles in the field, as the machine is moving thereover.

Should it be desired to use the device as a cultivator, the members 35 may be elevated by moving the bar 47 vertically within the guides 48, thereby moving the members 35 out of operative relation with the ground surface.

The plows 51 are now lowered to cause them to dig at the desired depth, and the machine is moved over the ground surface, to the end that the plows will cultivate the soil adjacent to the plants.

I claim:—

1. In a machine of the class described, a wheel supported frame, a rotary chopping member including a hub, arms radiating from the hub and having elongated openings, blade supporting arms having elongated openings, means disposed within the openings to adjustably connect the arms, blades pivotally mounted at the outer ends of the blade supporting arms, coiled springs connected with the blades for normally holding the blades to their active positions, and means for rotating the chopping member.

2. In a machine of the class described, a hub, arms extending from the hub and having elongated openings, straps secured to the arms, blade supporting arms having elongated openings, bolts supported by the straps and adapted to move in the elongated openings, straps carried by the blade supporting arms, bolts carried by the last mentioned straps and adapted to move in the elongated openings of the first mentioned arms, to adjustably support the blade supporting arms, blades pivotally mounted on the outer ends of the blade supporting arms, and coiled springs disposed between the blades and last mentioned straps for restricting movement of the blades.

In testimony that I claim the foregoing as my own, I have hereto affixed my signature.

ROBERT J. FOSTER.